(12) United States Patent
Clevinger (10) Patent No.: US 11,305,207 B2
(45) Date of Patent: Apr. 19, 2022

(54) DETACHABLE AND ADJUSTABLE WHEELED BASE FOR MOBILE DEVICE

(71) Applicant: Bradford Clevinger, Tehachapi, CA (US)

(72) Inventor: Bradford Clevinger, Tehachapi, CA (US)

( * ) Notice: Subject to any disclaimer, the term of this patent is extended or adjusted under 35 U.S.C. 154(b) by 775 days.

(21) Appl. No.: 16/183,213

(22) Filed: Nov. 7, 2018

(65) Prior Publication Data
US 2019/0143233 A1    May 16, 2019

Related U.S. Application Data (60) Provisional application No. 62/584,222, filed on Nov. 10, 2017.

(51) Int. Cl.
| | |
|---|---|
| *A63H 17/26* | (2006.01) |
| *H04M 1/04* | (2006.01) |
| *A63H 29/04* | (2006.01) |
| *A63H 29/22* | (2006.01) |

(52) U.S. Cl.
CPC ........... *A63H 17/262* (2013.01); *A63H 29/04* (2013.01); *A63H 29/22* (2013.01); *H04M 1/04* (2013.01)

(58) Field of Classification Search
CPC ...... A63H 17/262; A63H 29/22; A63H 29/04; A63H 7/04; H04M 1/04
USPC ............ 446/71, 78, 275, 279, 435, 439, 471
See application file for complete search history.

(56) References Cited

U.S. PATENT DOCUMENTS

| | | | | |
|---|---|---|---|---|
| 2,164,299 A * | 6/1939 | Mandell | .................... | A47G 1/08 40/741 |
| 3,654,727 A * | 4/1972 | Span | .................... | A63H 17/002 446/94 |
| 3,777,392 A * | 12/1973 | Span | .................... | A63H 17/002 446/78 |
| 4,551,109 A * | 11/1985 | Hanson | ................ | A63H 33/001 446/465 |
| 4,822,316 A * | 4/1989 | Shaffer | ................ | A63H 17/262 446/466 |
| 5,090,143 A * | 2/1992 | Schier | ........................ | G09F 1/12 40/603 |
| 6,589,098 B2 * | 7/2003 | Lee | ........................ | A63H 17/004 446/431 |
| 6,637,608 B1 * | 10/2003 | Schneider | .............. | A47B 45/00 211/175 |
| 6,789,688 B2 * | 9/2004 | Roush | .................... | A47F 5/0018 211/201 |

(Continued)

*Primary Examiner* — Joseph B Baldori (57) ABSTRACT

The present disclosure relates to a toy that provides attachable wheeled base for a mobile device to turn the mobile device into a wheeled toy. In one embodiment, the disclosed toy comprises a four linkages with each linkage connecting a wheel, a first alignment telescoping rod connecting the first linkage and the third linkage, a second alignment telescoping rod connecting the second linkage and the fourth linkage, a first flat bar that connects the first linkage and the fourth linkage, and a second flat bar that connects the second linkage and the third linkage. The flat bars form a scissor structure so that when it expands, the alignment telescoping rods will retract causing distance between first and second linkage and distance between third and fourth linkage to increase, and distance between first and third linkage and distance between second and fourth linkage to decrease.

20 Claims, 8 Drawing Sheets

(56) References Cited

U.S. PATENT DOCUMENTS

| | | | | |
|---|---|---|---|---|
| 7,128,299 B1* | 10/2006 | Klotz | ............... | A47G 23/03 |
| | | | | 248/346.11 |
| 7,244,163 B2* | 7/2007 | Benassi | ............... | A63H 17/002 |
| | | | | 446/269 |
| 8,112,924 B2* | 2/2012 | Longobardo | ....... | G09F 15/0018 |
| | | | | 40/606.13 |
| 8,118,272 B2* | 2/2012 | Liou | ............... | F16M 13/02 |
| | | | | 248/287.1 |
| 8,235,334 B1* | 8/2012 | Kobal | ............... | F16M 11/38 |
| | | | | 248/122.1 |
| 8,240,628 B2* | 8/2012 | Huang | ............... | F16M 13/00 |
| | | | | 248/316.1 |
| 8,544,161 B2* | 10/2013 | Carnevali | ......... | B60R 11/0241 |
| | | | | 29/450 |
| 9,267,641 B2* | 2/2016 | Gillespie-Brown | ... | F16M 11/22 |
| 9,297,495 B2* | 3/2016 | Fischer | ............... | F16M 13/00 |
| 9,403,623 B2* | 8/2016 | Aaland | ............... | B65D 25/10 |
| 9,664,214 B1* | 5/2017 | Gupta | ............... | F16B 2/10 |
| 10,001,153 B1* | 6/2018 | Fan | ............... | F16M 11/041 |
| 10,207,652 B2* | 2/2019 | Yu | ............... | F16M 13/00 |
| 11,052,323 B2* | 7/2021 | Rope | ............... | A63H 29/18 |
| 2010/0108828 A1* | 5/2010 | Yu | ............... | F16M 13/00 |
| | | | | 248/123.11 |
| 2020/0101394 A1* | 4/2020 | Dunham | ............... | A63H 17/262 |
| 2021/0101085 A1* | 4/2021 | Vetuskey | ............... | A63H 17/262 |
| 2021/0262611 A1* | 8/2021 | Eke-Okoro | ......... | F16M 11/041 |

* cited by examiner

DETACHABLE AND ADJUSTABLE WHEELED BASE FOR MOBILE DEVICE

CROSS-REFERENCE TO RELATED PATENT APPLICATIONS

Embodiments of the present invention relate to U.S. Provisional Application Ser. No. 62/584,222, filed Nov. 10, 2017, entitled "DETACHABLE WHEELS FOR MOBILE DEVICE", the contents of which are incorporated by reference herein in its entirety and which is a basis for a claim of priority.

FIELD OF THE INVENTION

Embodiments of the present disclosure generally relate to a toy, and more specifically to a detachable wheeled base that can attach to a mobile device such as a mobile phone and turn the mobile device into a wheeled toy.

SUMMARY OF THE DISCLOSURE

The major objective of the present disclosure is to provide a toy wheeled base that is attachable to a mobile device (or its casing) and turns the mobile device into a wheeled toy or a toy car.

In accordance with one aspect of at least one embodiment of the present disclosure, the disclosed toy wheeled base comprises a first linkage, a second linkage, a third linkage and a fourth linkage, wherein each of the linkages is connected with a wheel; a first alignment telescoping rod connecting the first linkage and the third linkage, wherein the first alignment telescoping rod is configured to increase the distance between the first linkage and the third linkage when it extends and decrease the distance between the first linkage and the third linkage when it retracts; a second alignment telescoping rod connecting the second linkage and the fourth linkage, wherein the second alignment telescoping rod is configured to increase the distance between the second linkage and the fourth linkage when it extends and decrease the distance between the second linkage and the fourth linkage when it retracts; a first flat bar that pivotally connects to the first linkage on one end and pivotally connects to the fourth linkage on another end; and a second flat bar that pivotally connects to the second linkage on one end and pivotally connects to the third linkage on another end.

The scissor structure is configured in a way that when it expands, the first alignment telescoping rod and the second alignment telescoping rod will retract causing distance between the first linkage and the second linkage and distance between the third linkage and the fourth linkage to increase, and distance between the first linkage and the third linkage and distance between the second linkage and the fourth linkage to decrease.

The first linkage, the second linkage, the third linkage, the fourth linkage, the first alignment telescoping rod, the second alignment telescoping rod, the first flat bar and the second flat bar together form a chassis for the toy wheeled base and the chassis provides a space for a mobile device to be placed on and secured to the chassis. Thereby turning the mobile device into a wheeled toy.

The foregoing and other objects, features and advantages of the present invention are more readily apparent from the detailed description of the preferred embodiments set forth below, taken in conjunction with the accompanying drawings.

DETAILED DESCRIPTION OF PREFERRED EMBODIMENTS

The following description is not to be taken in a limiting sense, but is made merely for the purpose of illustrating the general principles of the invention, since the scope of the invention is best defined by the following claims. Various inventive features are described below that can each be used independently of one another or in combination with other features.

Figure 1:
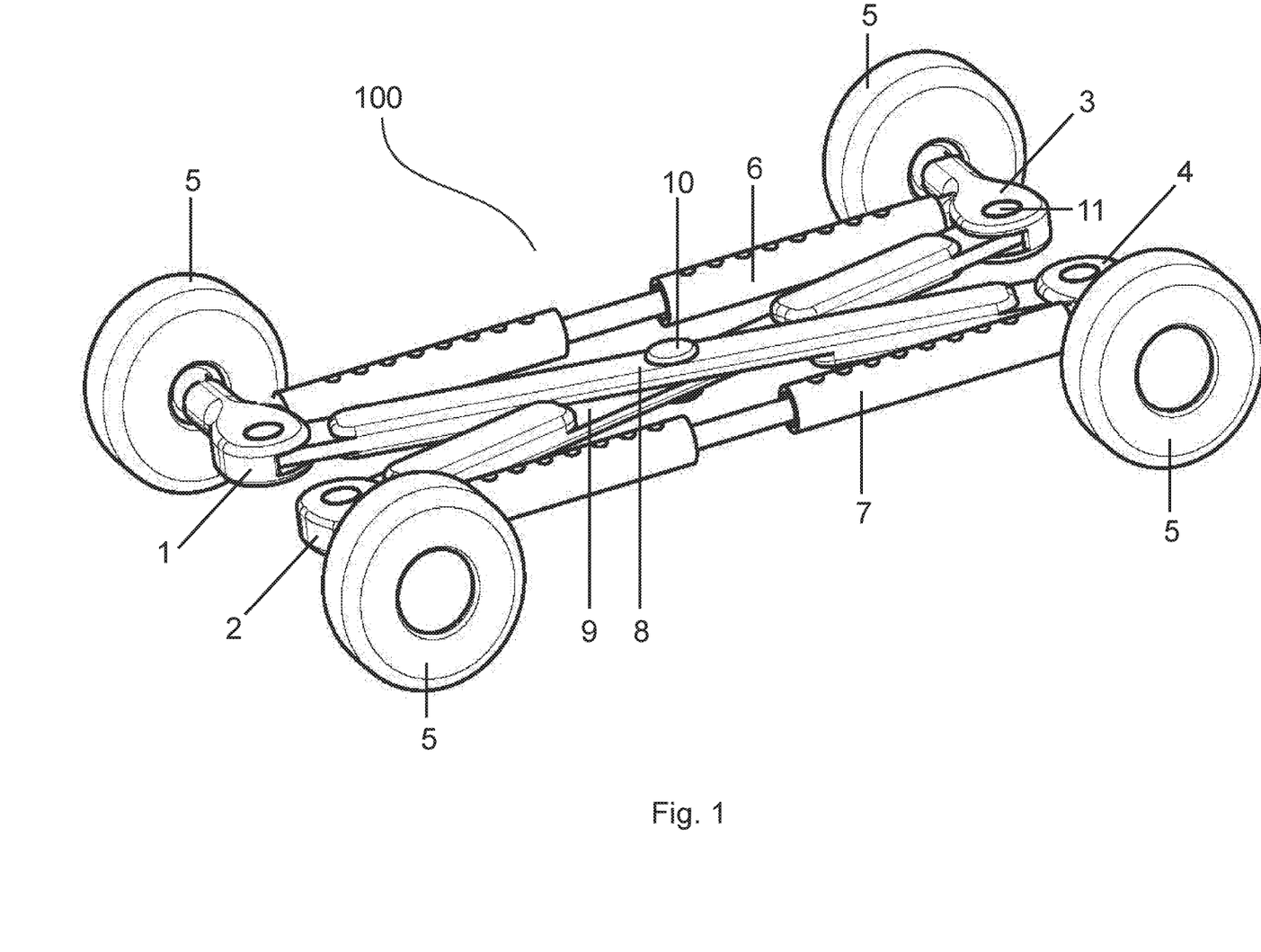
FIG. 1 is a schematic diagram according to an exemplary embodiment of the present disclosure.
Figure 2:
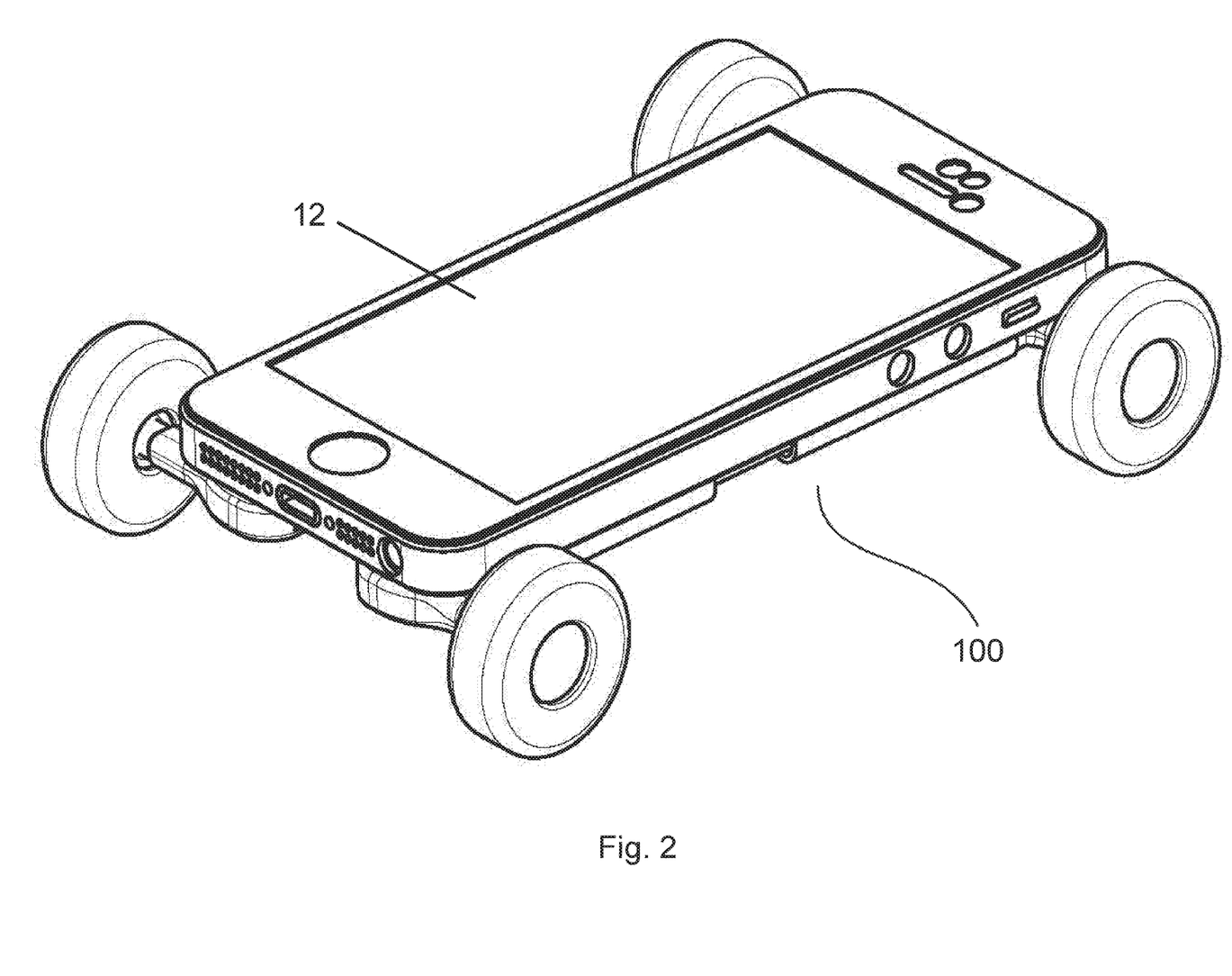
FIG. 2 is a schematic diagram according to an exemplary embodiment of the present disclosure.
Figure 3:
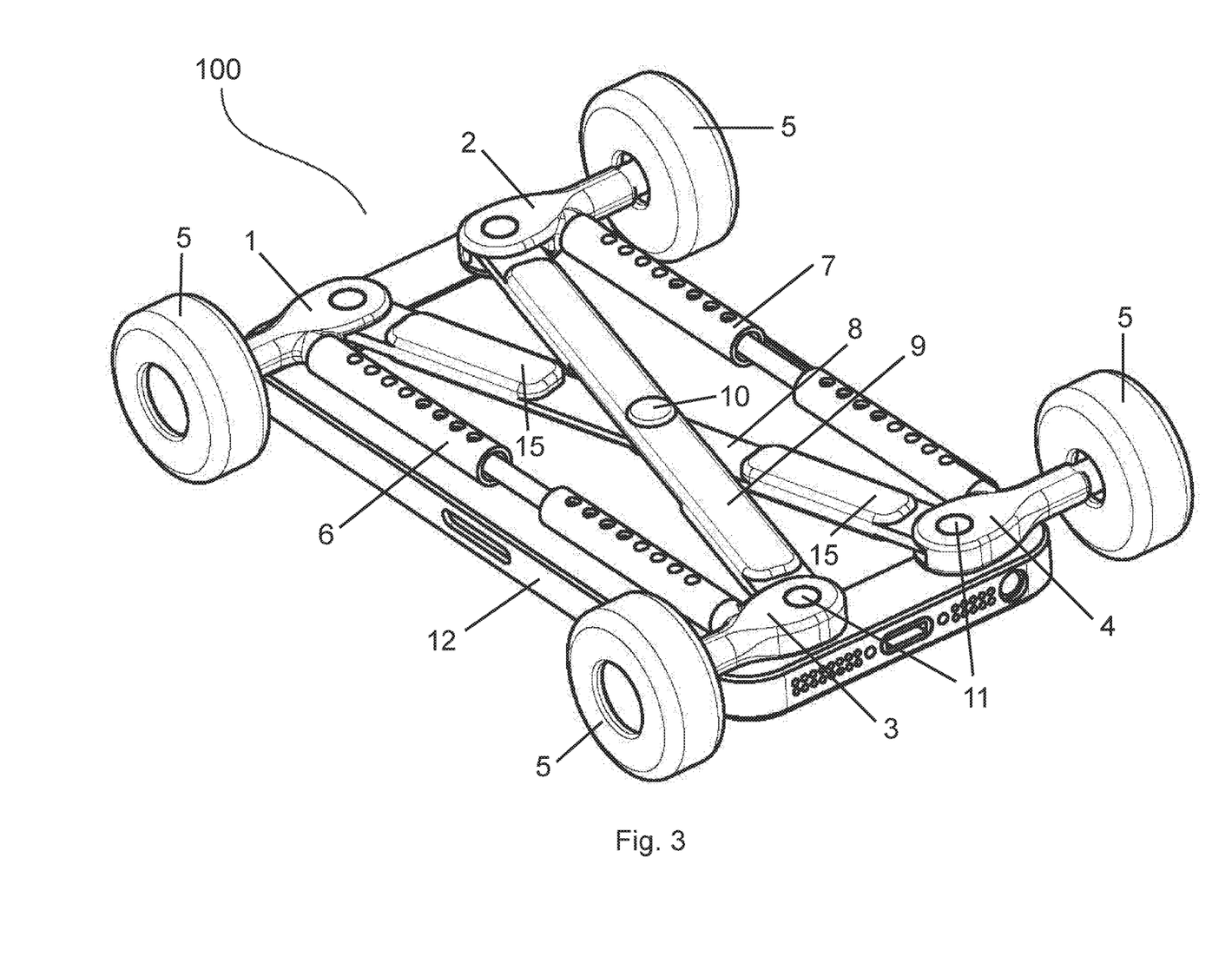
FIG. 3 is a schematic diagram according to an exemplary embodiment of the present disclosure.

Broadly, embodiments of the present disclosure generally provide a detachable wheeled base that can be attached to a mobile device such as a mobile phone or a tablet and turn the mobile phone or the tablet into a wheeled toy. In one embodiment, as shown by FIGS. 1 to 3, the disclosed toy wheeled base 100 comprises a first linkage 1, a second linkage 2, a third linkage 3, a fourth linkage 4, a first alignment telescoping rod 6 connecting the first linkage 1 and the third linkage 3, a second alignment telescoping rod 7 connecting the second linkage 2 and the fourth linkage 4, a first flat bar 8 that rotatably connects to the first linkage 1 on one end and rotatably connects to the fourth linkage 4 on another end and a second flat bar 9 that rotatably connects to the second linkage 2 on one end and rotatably connects to the third linkage 3 on another end. Each linkage is pivotally and rotatably connected to a wheel 5. The first alignment telescoping rod 6 and the second alignment telescoping rod 7 are both an elongated object with a mean to extend and retract.

Figure 4:
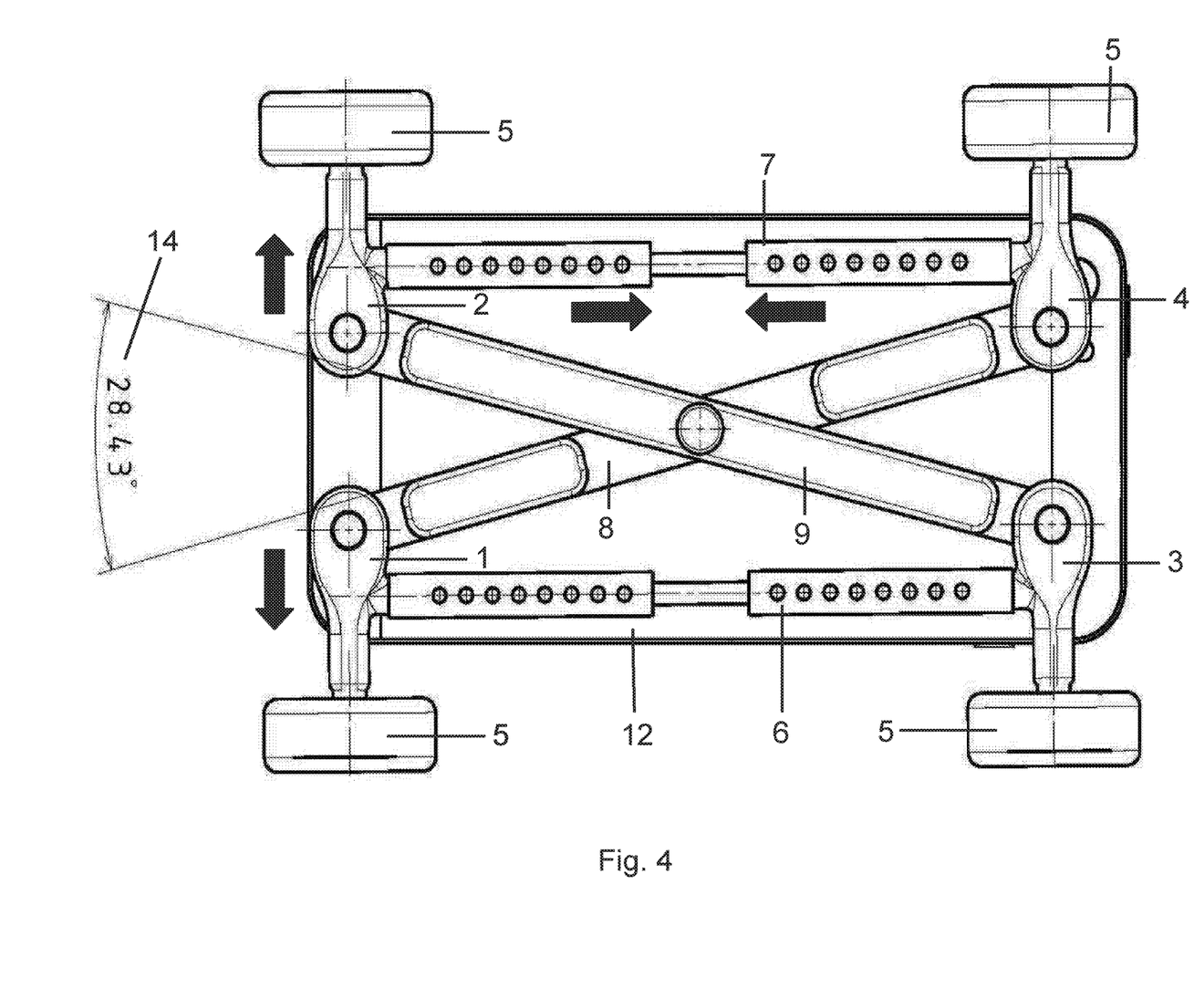
FIG. 4 is a schematic diagram according to an exemplary embodiment of the present disclosure.

The first flat bar 8 is rotatably connected to the second flat bar 9 to form a scissor structure as shown in FIGS. 1, 3 and 4. This can be done by connecting the flat bars through a pin 10 or any other means known by person with ordinary skills in the art. Also, the flat bars can rotatably connect to linkages through pivot screws 11 or any other means known by person with ordinary skills in the art as well. As shown by FIG. 4, the scissor structure is configured in a way that when it expands (i.e., the angle 14 is increased), the first alignment telescoping rod 6 and the second alignment telescoping rod 7 will retract causing distance between the first linkage 1 and the second linkage 2 and distance between the third linkage 3 and the fourth linkage 4 to increase, and distance between the first linkage 1 and the third linkage 3 and distance between the second linkage 2 and the fourth linkage 4 to decrease. Conversely, when the scissor structure is contracted (i.e., the angle 14 is decreased), the first alignment telescoping rod 6 and the second alignment telescoping rod 7 will extend causing distance between the first linkage 1 and the second linkage 2 and distance between the third linkage 3 and the fourth linkage 4 to decrease, and distance between the first linkage 1 and the third linkage 3 and distance between the second linkage 2 and the fourth linkage 4 to increase. The scissor structure may also be designed to serve as parallel constraints that ensures proper alignment of all wheels 5 (or linkages). Linkages are primarily designed to expand to adapt to mobile device's widths. Further, as shown by FIG. 3, the flat bars may optionally include protrusions 15 or similar designs that prevent flat bars from crossing each other. The protrusions 15 can also be used to set the minimum width for the toy wheeled base 100 and protect linkages (i.e., 1 and 2, 3 and 4) from contacting each other.

The first linkage 1, the second linkage 2, the third linkage 3, the fourth linkage 4, the first alignment telescoping rod 6, the second alignment telescoping rod 7 and the scissor structure (i.e., the first flat bar 8 and the second flat bar 9) together form a chassis for the toy wheeled base 100. A user may then place a mobile device 12 such a mobile phone or a tablet on the chassis as shown by FIG. 2, thereby turning the mobile device 12 into a wheeled toy where the it can be maneuvered as desired by the user.

Figure 5:
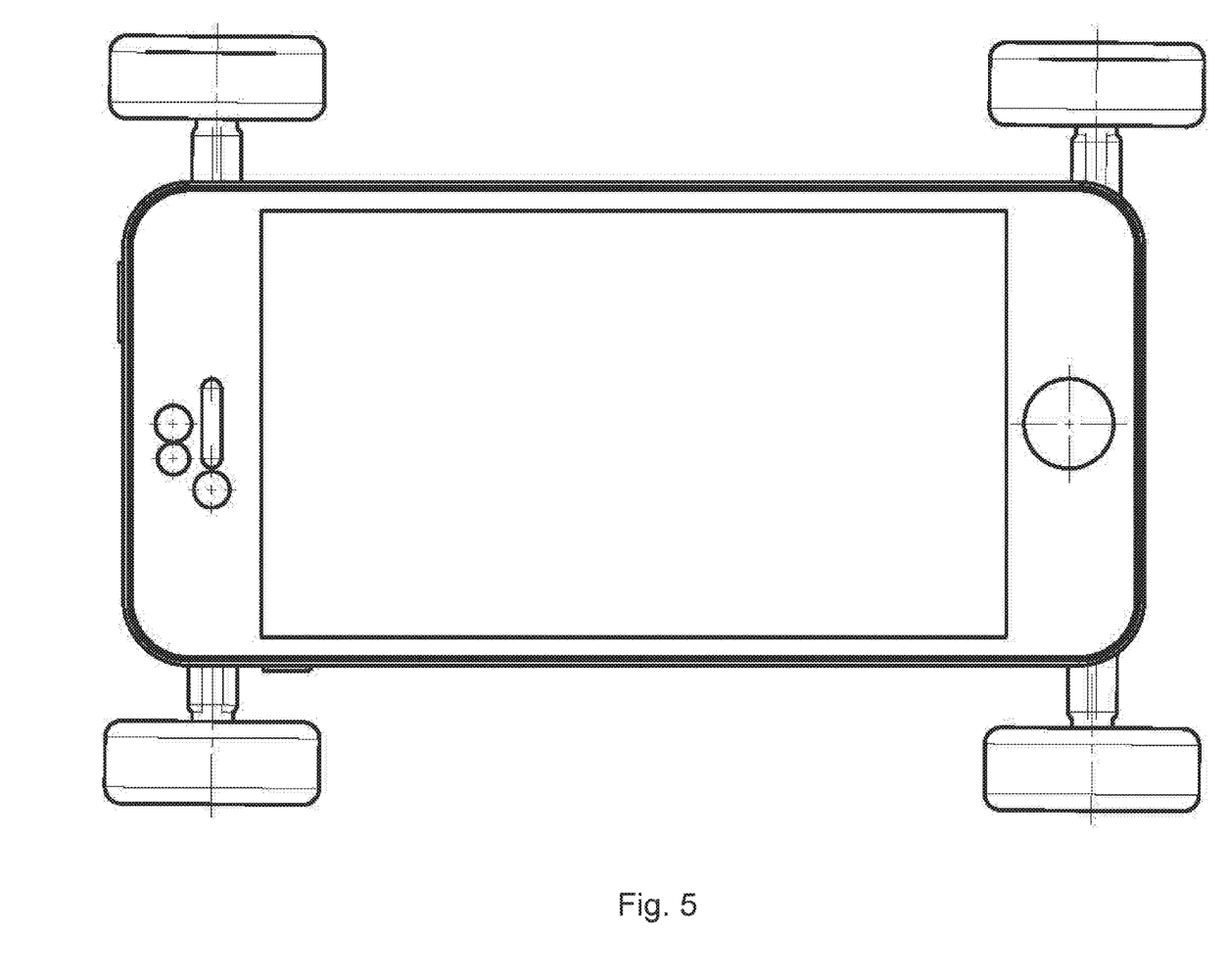
FIG. 5 is a schematic diagram according to an exemplary embodiment of the present disclosure.
Figure 6:
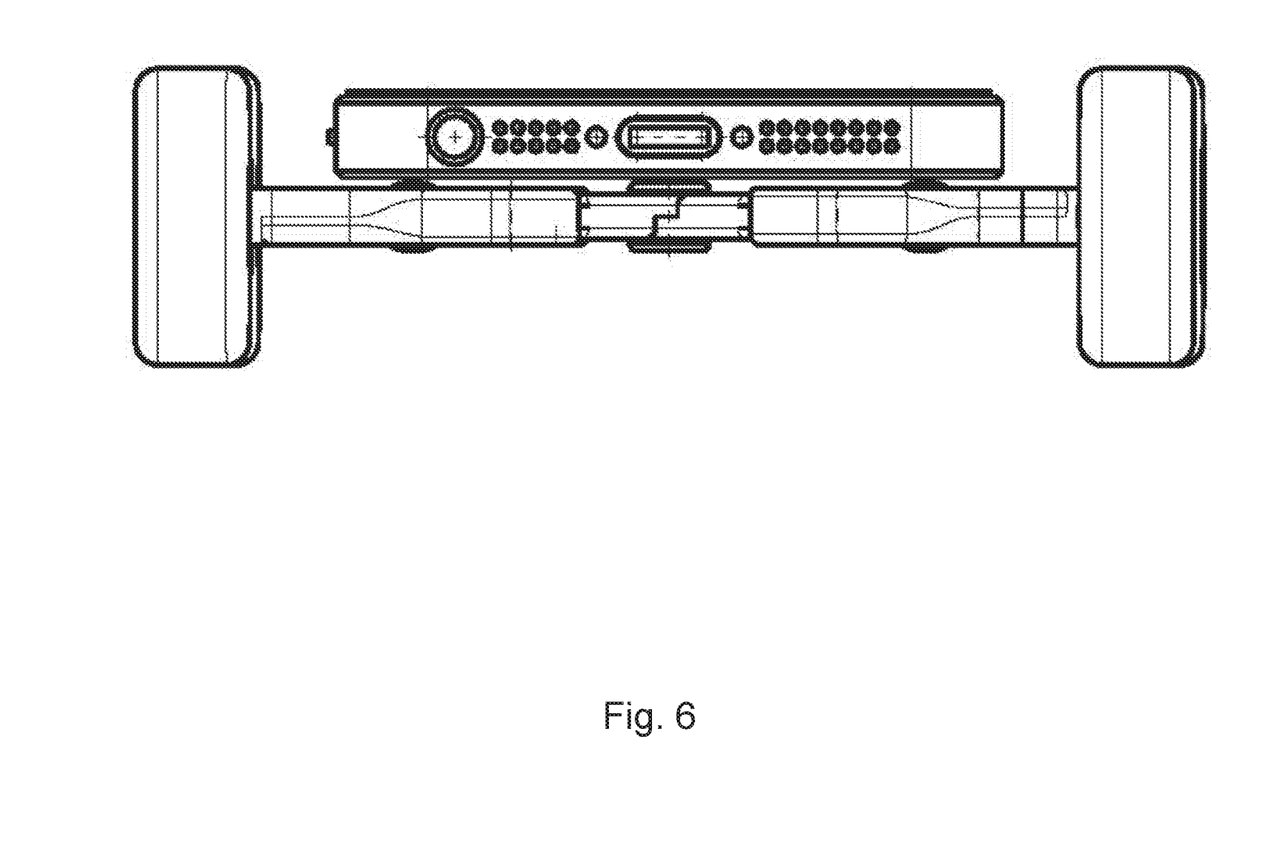
FIG. 6 is a schematic diagram according to an exemplary embodiment of the present disclosure.
Figure 7:
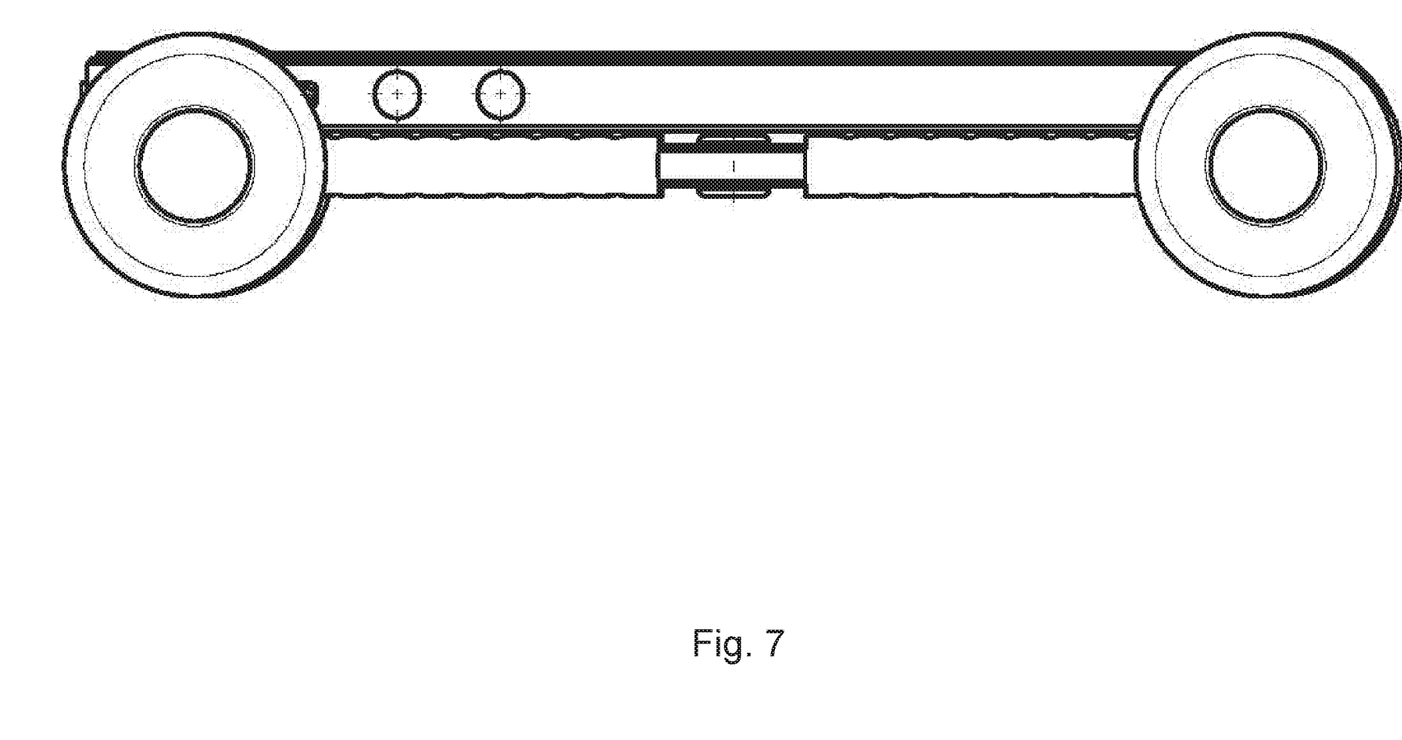
FIG. 7 is a schematic diagram according to an exemplary embodiment of the present disclosure.
Figure 8:
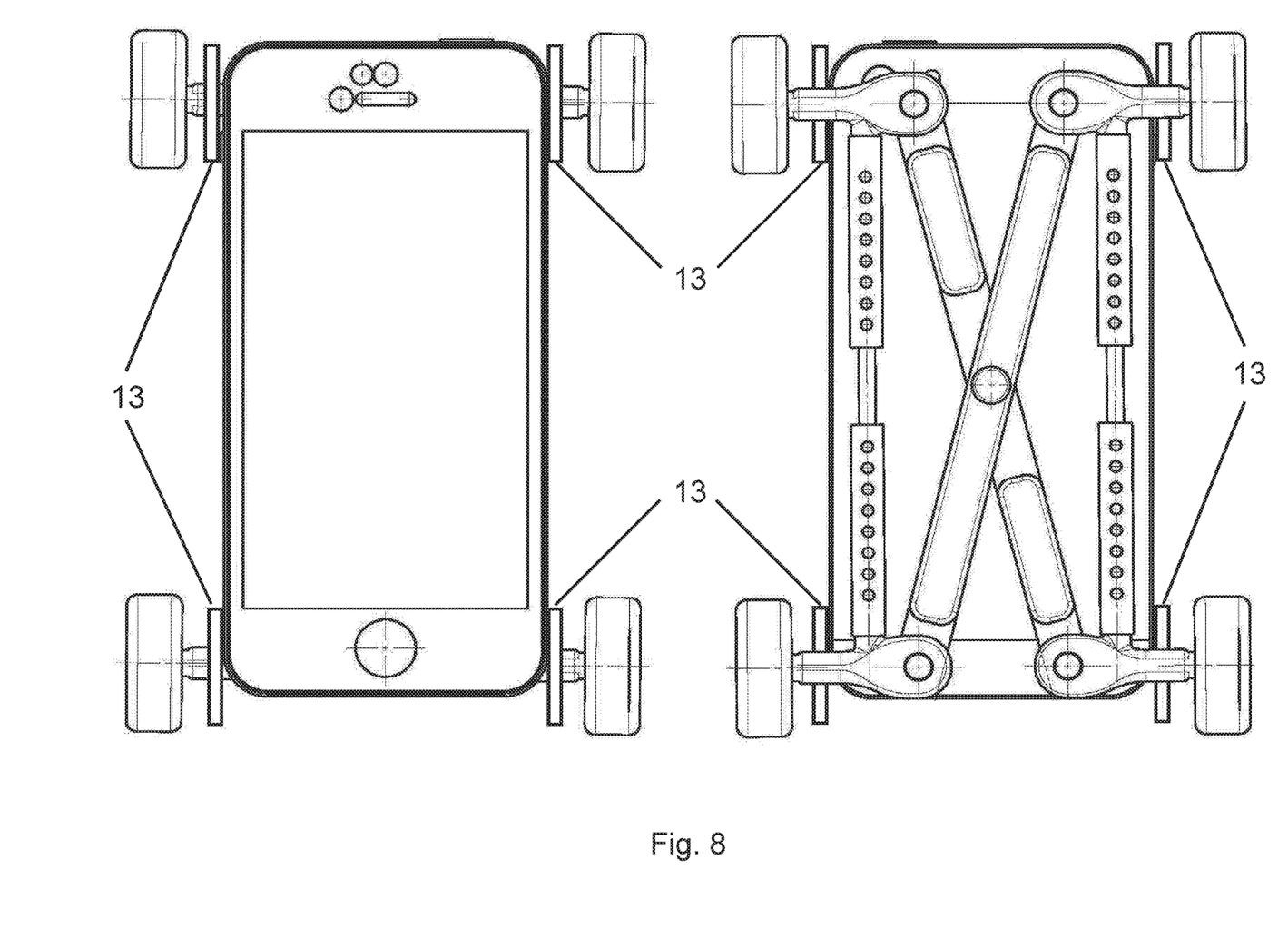
FIG. 8 is a schematic diagram according to an exemplary embodiment of the present disclosure.

Optionally, the toy wheeled base 100 may further comprises a mean for securing the mobile device 100 on the chassis. For example, as shown by FIG. 8, side catches 13 can be placed on linkages so that when the scissor section is contracted after expansion, it holds the mobile device 12 in place and prevents the mobile device 12 to be in contact with wheels 5. Alternatively, the mobile device 12 may simply be secured to the chassis through gravitational force (i.e., mobile device's 12 own weight) as shown by FIGS. 5, 6 and 7. Under this configuration, the chassis or part of the chassis (i.e., the telescoping rod, the flat bar and/or linkages) should be made with a material with good friction and grip (e.g., rubber) or should use anti-slip pads (or mats) to prevent the mobile device 12 from sliding off the toy wheeled base 100.

In yet one embodiment of the present disclosure, the toy wheeled base 100 may further comprises at least one pull-back motor that is connected to at least one wheel 5. When the toy wheeled base 100 is being pulled backward, it winds up an internal coil spring in the pullback motor and when released, the toy wheeled base is propelled forward by the spring. An electric motor can also be used to provide mechanical force to at least one wheel.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A toy wheeled base comprising:
   a first linkage, a second linkage, a third linkage and a fourth linkage, wherein each of the linkages is connected with a wheel;
   a first alignment telescoping rod connecting the first linkage and the third linkage;
   a second alignment telescoping rod connecting the second linkage and the fourth linkage;
   a first flat bar that is connected to the first linkage on one end and the fourth linkage on another end;
   a second flat bar that is connected to the second linkage on one end and the third linkage on another end;
   wherein the first flat bar is connected to the second flat bar to form a scissor structure, wherein the scissor structure is configured in a way that when it expands, the first alignment telescoping rod and the second alignment telescoping rod will retract causing distance between the first linkage and the second linkage and distance between the third linkage and the fourth linkage to increase, and distance between the first linkage and the third linkage and distance between the second linkage and the fourth linkage to decrease.

2. The toy wheeled base of claim 1 further comprises a mean for securing a mobile device.

3. The toy wheeled base of claim 2, wherein the first linkage, the second linkage, the third linkage, the fourth linkage, the first alignment telescoping rod, the second alignment telescoping rod, the first flat bar and the second flat bar forms a chassis for the mobile device and the mobile device is secured on the chassis through gravitational, clipping or pressing force.

4. A toy wheeled base comprising:
   a first linkage, a second linkage, a third linkage and a fourth linkage, wherein each of the linkages is connected with a wheel;
   a first alignment telescoping rod connecting the first linkage and the third linkage, wherein the first alignment telescoping rod is configured to increase the distance between the first linkage and the third linkage when it extends and decrease the distance between the first linkage and the third linkage when it retracts;
   a second alignment telescoping rod connecting the second linkage and the fourth linkage, wherein the second alignment telescoping rod is configured to increase the distance between the second linkage and the fourth linkage when it extends and decrease the distance between the second linkage and the fourth linkage when it retracts;
   a first flat bar that rotatably connects to the first linkage on one end and rotatably connects to the fourth linkage on another end; and
   a second flat bar that rotatably connects to the second linkage on one end and rotatably connects to the third linkage on another end.

5. The toy wheeled base of claim 4, wherein the first flat bar is pivotally connected to the second flat bar and forms a scissor structure with parallel constraints that ensures proper alignment of all wheels.

6. The toy wheeled base of claim 5, wherein the first flat bar is pivotally connected to the second flat bar through a pin.

7. The toy wheeled base of claim 5, wherein the scissor structure is configured in a way that when it expands, the first alignment telescoping rod and the second alignment telescoping rod will retract causing distance between the first linkage and the second linkage and distance between the third linkage and the fourth linkage to increase, and distance between the first linkage and the third linkage and distance between the second linkage and the fourth linkage to decrease.

8. The toy wheeled base of claim 4, wherein the first flat bar is rotatably connected to the first linkage and the fourth linkage through pivot screws, and the second flat bar is rotatably connected to the second linkage and the third linkage through pivot screws.

9. The toy wheeled base of claim 4, wherein the first linkage, the second linkage, the third linkage, the fourth linkage, the first alignment telescoping rod, the second alignment telescoping rod, the first flat bar and the second flat bar forms a chassis for the toy wheeled base and the chassis provides a space for a mobile device to be placed on and secured to the chassis.

10. The toy wheeled base of claim 9, wherein the mobile device is secured to the chassis through gravitational force.

11. The toy wheeled base of claim 9, wherein the mobile device is secured to the chassis through side catches locating on the first linkage, the second linkage, the third linkage and the fourth linkage.

12. The toy wheeled base of claim 4 further comprises at least one pullback motor that is connected to at least one wheel, wherein when the toy wheeled base is being pulled backward, it winds up an internal coil spring in the pullback motor and when released, the toy wheeled base is propelled forward by the spring.

13. The toy of claim 4, further comprises an electric motor that provides mechanical force for at least one wheel.

14. A toy wheeled base comprising:
   a first linkage;
   a second linkage that is opposite to the first linkage;
   a third linkage that is paralleled with the first linkage;
   a fourth linkage that is paralleled with the second linkage and opposite to the third linkage;
   wherein each of the first linkage, the second linkage, the third linkage and the fourth linkage is pivotally and rotatably connected to a wheel;
   a first alignment telescoping rod connecting the first linkage and the third linkage, wherein the first alignment telescoping rod is configured to increase the distance between the first linkage and the third linkage when it extends and decrease the distance between the first linkage and the third linkage when it retracts;
   a second alignment telescoping rod connecting the second linkage and the fourth linkage, wherein the second alignment telescoping rod is configured to increase the distance between the second linkage and the fourth linkage when it extends and decrease the distance between the second linkage and the fourth linkage when it retracts;
   a first flat bar that pivotally connects to the first linkage on one end and pivotally connects to the fourth linkage on another end;
   a second flat bar that pivotally connects to the second linkage on one end and pivotally connects to the third linkage on another end; and
   wherein the first flat bar is pivotally connected to the second flat bar and forms a scissor structure with parallel constraints that ensures proper alignment of all the wheels.

15. The toy wheeled base of claim 14, wherein the scissor structure is configured in a way that when it expands, the first alignment telescoping rod and the second alignment telescoping rod will retract causing distance between the first linkage and the second linkage and distance between the third linkage and the fourth linkage to increase, and distance between the first linkage and the third linkage and distance between the second linkage and the fourth linkage to decrease.

16. The toy wheeled base of claim 14, wherein the first linkage, the second linkage, the third linkage, the fourth linkage, the first alignment telescoping rod, the second alignment telescoping rod, the first flat bar and the second flat bar forms a chassis for the toy wheeled base and the chassis provides a space for a mobile device to be placed on and secured to the chassis.

17. The toy wheeled base of claim 16, wherein the mobile device is secured to the chassis through gravitational force.

18. The toy wheeled base of claim 16, wherein the mobile device is secured to the chassis through side catches locating on the first linkage, the second linkage, the third linkage and the fourth linkage.

19. The toy wheeled base of claim 16 further comprises at least one pullback motor that is connected to at least one wheel, wherein when the toy wheeled base is being pulled backward, it winds up an internal coil spring in the pullback motor and when released, the toy wheeled base is propelled forward by the spring.

20. The toy of claim 16, further comprises an electric motor that provides mechanical force for at least one wheel.

* * * * *